(12) United States Patent
Raith

(10) Patent No.: US 6,885,869 B2
(45) Date of Patent: Apr. 26, 2005

(54) METHOD FOR MATING A MOBILE TERMINAL WITH A CORDLESS PHONE SYSTEM

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 616 days.

(21) Appl. No.: 09/771,463

(22) Filed: Jan. 26, 2001

(65) Prior Publication Data

US 2002/0102974 A1 Aug. 1, 2002

(51) Int. Cl.$^7$ ................................................. H04Q 7/20
(52) U.S. Cl. ............................. 455/456.6; 455/456.1; 455/457; 455/462; 455/525
(58) Field of Search .......................... 455/456.6, 456.1, 455/457, 462, 525, 456.3

(56) References Cited

U.S. PATENT DOCUMENTS

| | | |
|---|---|---|
| 5,442,680 A | 8/1995 | Schellinger et al. |
| 5,477,215 A | 12/1995 | Mandelbaum |
| 5,537,474 A | 7/1996 | Brown et al. |
| 5,613,204 A | 3/1997 | Haberman et al. |
| 5,670,950 A | 9/1997 | Otsuka |
| 5,794,141 A | 8/1998 | Zicker |
| 5,805,067 A | 9/1998 | Bradley et al. |
| 5,870,674 A | 2/1999 | English |
| 5,875,395 A | 2/1999 | Holmes |
| 5,911,120 A | 6/1999 | Jarett et al. |
| 5,926,760 A | 7/1999 | Khan et al. |
| 5,956,626 A | 9/1999 | Kaschke et al. |
| 5,960,085 A | 9/1999 | de la Huerga |
| 5,995,839 A | 11/1999 | Coursey et al. |
| 6,011,960 A | 1/2000 | Yamada et al. |
| 6,011,973 A | 1/2000 | Valentine et al. |
| 6,044,268 A | 3/2000 | Haartsen |
| 6,085,085 A * | 7/2000 | Blakeney et al. ......... 455/426.1 |
| 6,141,560 A | 10/2000 | Gillig et al. |
| 6,167,285 A | 12/2000 | Howe |
| 6,219,539 B1 | 4/2001 | Basu et al. |
| 6,236,859 B1 | 5/2001 | Morper |
| 6,285,881 B1 | 9/2001 | Huang |
| 6,405,063 B1 | 6/2002 | Hashimoto ................... 455/574 |
| 6,493,550 B1 | 12/2002 | Raith .......................... 455/422 |
| 6,625,457 B1 | 9/2003 | Raith ...................... 455/456.1 |
| 6,813,508 B1 * | 11/2004 | Shioda et al. ............... 455/525 |
| 2001/0022779 A1 * | 9/2001 | Wheatley et al. ........... 370/252 |

FOREIGN PATENT DOCUMENTS

| | | |
|---|---|---|
| EP | 0700227 A2 | 3/1996 |
| EP | 0858237 | 8/1998 |
| EP | 0880296 A1 | 11/1998 |
| GB | 2339649 | 2/2000 |
| GB | 2339649 A | 2/2000 |
| WO | WO9827766 | 6/1998 |

OTHER PUBLICATIONS

"Cordless Telephony Profile" from Bluetooth Specification, Version 1.0 B, Part K:3, Dec. 1, 1999.

* cited by examiner

Primary Examiner—Temica M. Beamer
Assistant Examiner—Joy Contee
(74) Attorney, Agent, or Firm—Coats & Bennett, P.L.L.C.

(57) ABSTRACT

A mobile terminal includes a primary transceiver to communicate with a mobile communication network and a secondary transceiver to communicate with a base unit of a cordless telephone system. When the mobile terminal is out of range of the base unit, it searches or listens for the base unit at a predetermined searching or listening frequency. The searching or listening frequency is dependent upon the distance of the mobile terminal from the base unit. A threshold is also established beyond which the mobile terminal may discontinue searching or listening for the base unit to conserve battery power or, alternatively, set the searching or listening frequency to a minimum value.

45 Claims, 6 Drawing Sheets

LOCATION A - SEARCH FREQUENCY 2
LOCATION B - SEARCH FREQUENCY 1
LOCATION C - SEARCHING DISABLED

METHOD FOR MATING A MOBILE TERMINAL WITH A CORDLESS PHONE SYSTEM

BACKGROUND OF THE INVENTION

The present invention generally relates to the field of wireless communications systems and, more particularly, to a dual mode mobile terminal capable of functioning as either a cellular radiotelephone or a cordless telephone.

The wireless communication industry has made phenomenal strides in commercial operations in the United States and the rest of the world. A goal of wireless communication devices is to provide users with access to the public switched telephone network without restriction by location or mobility. Growth of wireless communications in major metropolitan areas has far exceeded expectations. If this trend continues, it is possible that wireless communications will provide the bulk of telecommunication services in some areas.

As a result of this growth, wireless communication services have become more affordable and customers may choose to make wireless communication devices their primary means of personal communication. The popularity of wireless communication devices is further enhanced by their ability to be used for non-voice communication, such as facsimile and data transmission.

Two implementations of wireless communications are cordless telephones and cellular radiotelephones. Cordless telephones utilize a low-power RF link between a cordless handset and a base unit. The base unit is connected to the public switched telephone network (PSTN) in the same manner as a conventional corded telephone. There are no air-time charges associated with the home-based cordless telephone systems. Cordless telephone systems (CTS) support wireless communications over a short distance from the base unit. When a cordless handset moves outside the range of coverage of the base unit, its connection to the PSTN is broken.

In a cellular radiotelephone, a handheld unit generally referred to as a mobile terminal communicates with any one of a plurality of cellular base stations, which form the interface between a Public Land Mobile Network (PLMN) and the mobile terminal. The PLMN comprises a multiplicity of base stations, each of which connect to a mobile switching circuit (MSC). The PLMN may have one or more MSCs. At least one MSC, referred to as a gateway MSC, connects to the PSTN. Cellular radiotelephones use a higher-power RF link than a cordless telephone and consequently allow greater distances to be spanned between a base station and a mobile terminal. As the mobile terminal moves out of range of one base station, the link provided by that base station is handed off to an adjacent base station without interruption of the user's connection to the PSTN through the PLMN.

In the near future, wireless communication devices, such as mobile terminals, will incorporate position-estimating devices to enhance the function and utility of the wireless communication device. The Federal Communication Commissioner has recently implemented legislation requiring service providers to give accurate position of emergency (i.e., 911) callers. This requirement can be fulfilled by including a GPS receiver in the mobile terminal. Perhaps the best-known use of position estimating technology is for navigation. Another common use for position estimating devices is to identify facilities, such as hotels or restaurants, that are nearby the current position of the mobile terminal. Position information can also be used to enhance intrinsic functions of mobile terminals. For example, position information can be used to improve cell reselection or hand-off decisions in mobile terminals. Examples of how position information may be used to enhance intrinsic functions of the mobile terminal are described in the following U.S. patent application Ser. No. 09/498,785 entitled "Position Assisted Handoff in a Wireless Communication Network"; Ser. No. 09/505,431 entitled "Position Assisted Service Selection"; and Ser. No. 09/498,772 entitled "System and Method For Improving Channel Monitoring In a Cellular System." Position estimating devices have a broad variety of uses and can significantly enhance the utility and, therefore, the desirability of wireless communication devices.

BRIEF SUMMARY OF THE INVENTION

The present invention comprises a dual function mobile terminal that can function as both a cordless telephone and as a conventional cellular radiotelephone. The mobile terminal is equipped with a primary transceiver for communicating with a base station in a mobile communication network. The mobile terminal also includes a short-range radio interface, such as a Bluetooth interface, to communicate with a base unit of a cordless telephone system. When the mobile terminal is out of range of the base unit, the mobile terminal periodically searches for the base unit by transmitting messages to the base unit or listening for transmissions from the base unit. The frequency of such searching or other search behavior is dependent upon the distance of the mobile terminal from the base unit. For example, the mobile terminal may search for the base unit with greater frequency when it is closer to the base unit than when it is further away from the base unit. Additionally, a threshold may be established beyond which the mobile terminal discontinues searching or listening for the base unit to conserve power.

DETAILED DESCRIPTION OF THE INVENTION

Figure 1:
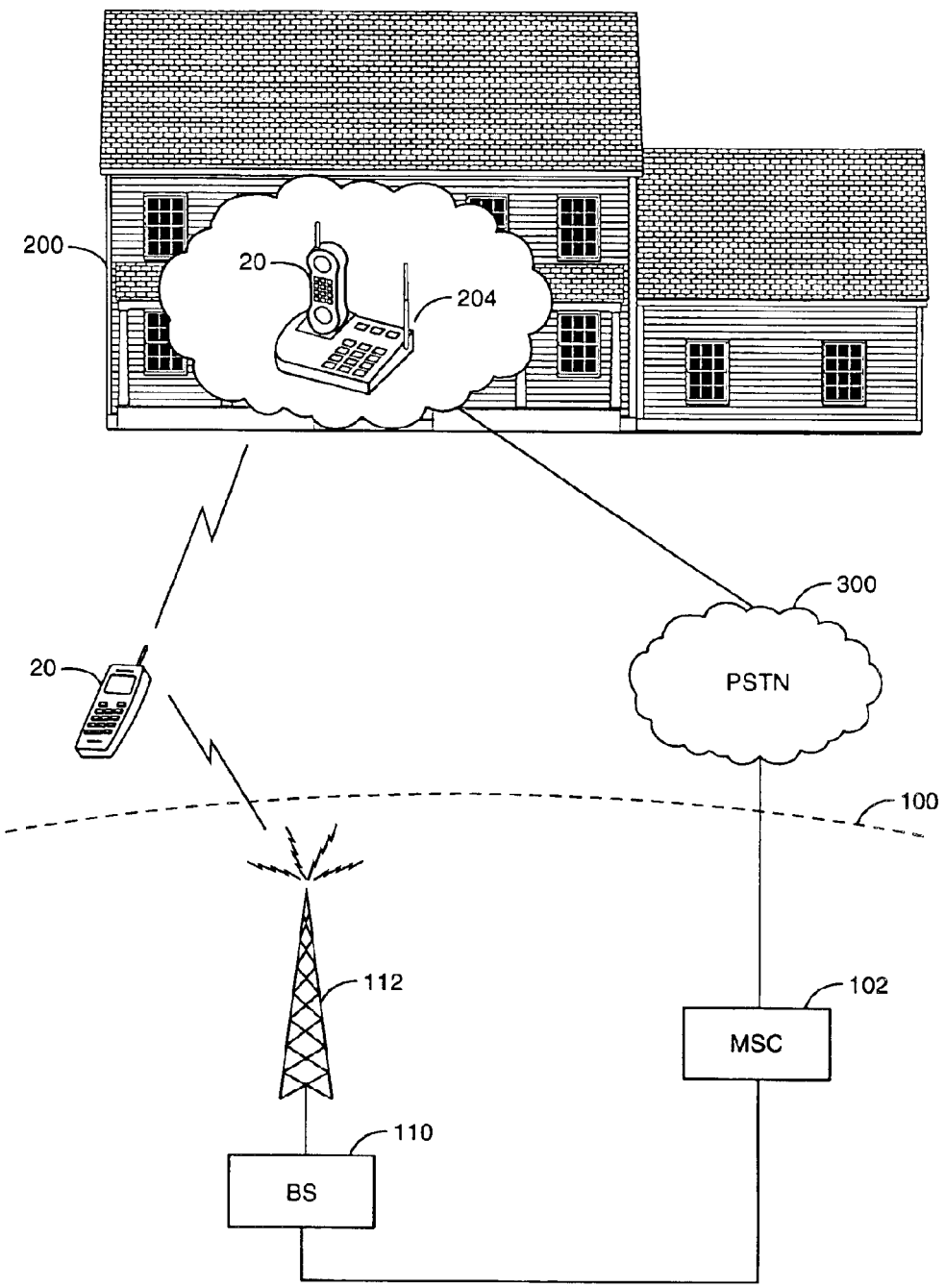
FIG. 1 is a schematic representation of a radio communication environment in which a mobile terminal operates.

Referring now to the drawings, FIG. 1 is a schematic representation of the radio communication environment in which a mobile terminal 20 operates. Mobile terminal 20 is in the coverage area of a public land mobile network (PLMN) 100. PLMN 100 comprises one or more base stations 110, each coupled to an antenna 112. Each base station 110 provides radio communication services to mobile terminals 20 within its area of coverage, which is generally referred to as a cell. Each base station 110 connects to a mobile switching center (MSC) 102, which in turn connects to the public switched telephone network (PSTN) 300. The PLMN 100 may have more than one MSC 102 which interconnect to form a core network.

Proximate to PLMN 100, and possibly within the coverage area of PLMN 100, is a private cordless telephone system (CTS) 200. CTS 200 comprises a base unit 204 that communicates over a short distance with the mobile terminal 20. Base unit 204 is connects to the PSTN 300.

The mobile terminal 20 of the present invention can communicate with PSTN 300 both via PLMN 100 and via CTS 200. When mobile terminal 20 is within range of base unit 204, the user may access the PSTN 300 via CTS 200. When mobile terminal 20 is out of range of CTS 200, the user of mobile terminal 20 accesses PSTN 300 via PLMN 100. No overt actions on the part of the user is required to establish or drop communications with the base unit 204.

Figure 2:
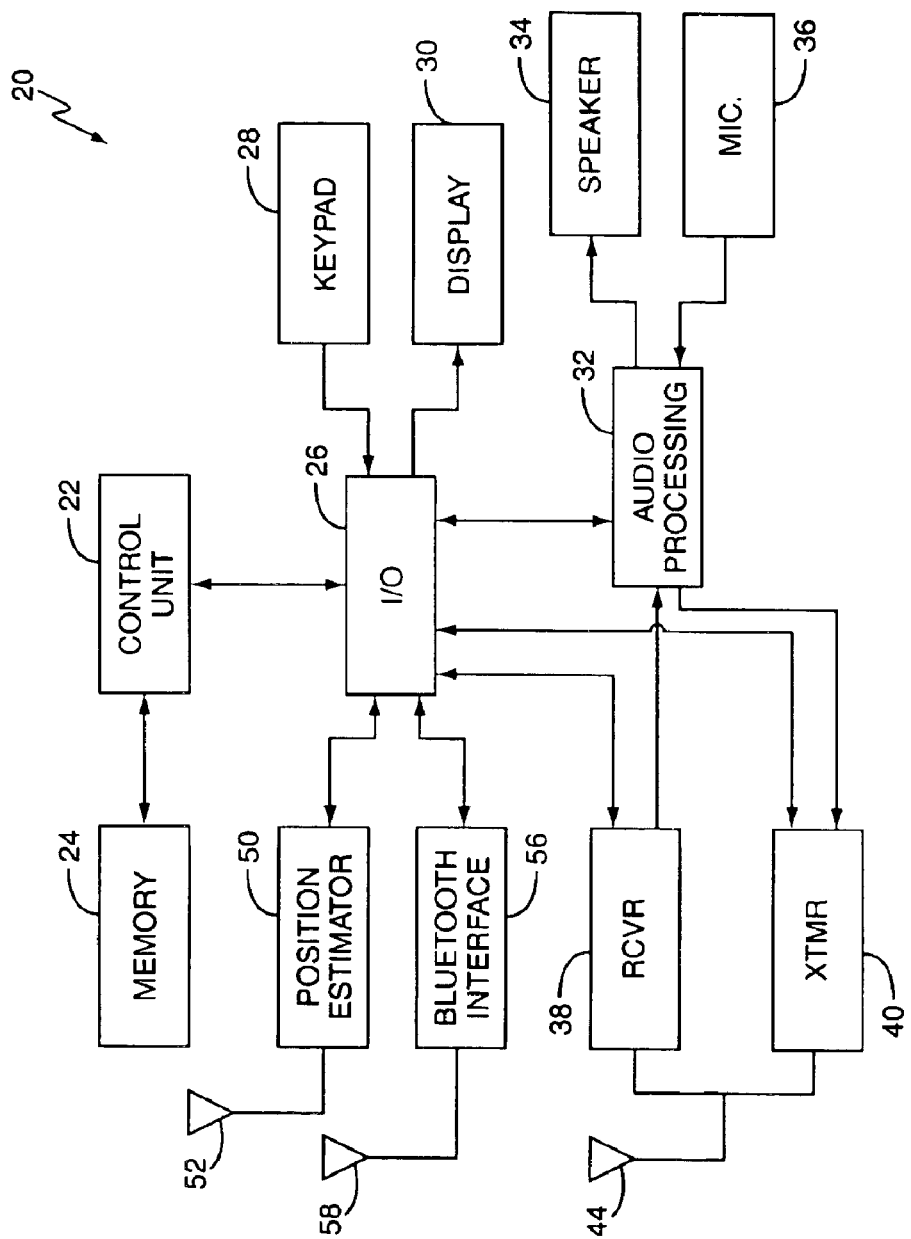
FIG. 2 is a block diagram illustrating the functional elements of an exemplary mobile terminal.

FIG. 2 is a functional block diagram of a mobile terminal 20. The term "mobile terminal" as used herein may comprise a cellular radiotelephone; a Personal Communications Service (PCS) terminal that combines a cellular radiotelephone with data processing, facsimile, and data communications capabilities; a Personal Digital Assistant (PDA) that may include a radiotelephone, pager, Internet/intranet access, Web browser, organizer, and/or calendar; a conventional laptop computer, a palmtop computer, or other appliance that includes a radiotelephone transceiver. Mobile terminal 20 may also be referred to as a "pervasive computing" device.

Mobile terminal 20 may employ a wide variety of communication standards and protocols, which are published by organizations such as the Telecommunications Industry Association/Electronics Industry Association (TIA/EIA) and the European Telecommunication Standards Institute (ETSI), including without limitation Time Division Multiple Access (TDMA) standards such as TIA/EIA-136 and the Global System for Mobile Communications (GSM), Code Division Multiple Access (CDMA) standards such as TIA/EIA-95, Wideband Code Division Multiple Access (WCDMA) standards such as cdma2000, Universal Wireless Communications (UWC) 136, satellite communication standards such as Globestar, and short-range wireless standards such as Bluetooth K3. The details of the communication protocols used by the mobile terminal 20 are not material to the invention.

Mobile terminal 20 comprises a main control unit 22 for controlling the operation of the mobile terminal 20 and memory 24 for storing control programs and data used by the mobile terminal 20 during operation. Memory 24 may be contained in a removable smart card. In particular, data such as the reference position of base unit 204 and various boundaries surrounding base unit 204 may be stored in memory 24. Input/output circuits 26 interface the control unit 22 with a keypad 28, display 30, audio processing circuits 32, receiver 38, transmitter 40, and positioning receiver 50. The keypad 28 allows the operator to dial numbers, enter commands, and select options. The display 30 allows the operator to see dialed digits, stored information, and call status information. The audio processing circuits 32 provide basic analog audio outputs to a speaker 34 and accept analog audio inputs from a microphone 36. The receiver 38 and transmitter 40 receive and transmit signals using shared antenna 44.

Mobile terminal 20 also includes an alternative interface 56, such as a "Bluetooth" interface, which may use a separate antenna 58. Bluetooth is a universal radio interface in the 2.45 GHz frequency band that enables portable electronic devices to connect and communicate wirelessly via short-range, adhoc networks. Persons interested in various details regarding the Bluetooth technology are referred to the article entitled "The Bluetooth Radio System" authored by Jaap Haartsen, which can be found in the IEEE Personal Communications, February, 2000, the disclosure of which is incorporated herein by reference. For the purposes of the present invention, only Bluetooth features of immediate interest are described herein.

The mobile terminal 20 may further include a radiolocation receiver 50 operatively coupled to a navigation signal antenna 52. Radiolocation receiver 50 functions to determine the geographical position or location of the mobile terminal 20 at a predetermined update frequency. Radiolocation receiver 50 generates geographic position estimates under the direction of the control unit 22 based on navigation signals received through navigation signal antenna 52. These navigation signals may be broadcast by navigation satellites, e.g. those of the Global Positioning System (GPS). GPS signal reception and position determination therefrom are well known in the art. Such position determination is disclosed in U.S. Pat. No. 4,968,981 to Sekine, et al., entitled "GPS Receiver Apparatus," the disclosure of which is incorporated herein in its entirety. Other position determining technologies are also available, for example the Russian equivalent to the GPS system. There are also terrestrial based position and navigation systems (e.g. LORAN), which could be used to practice the present invention.

Navigation signal antenna 52 receives navigation signals, e.g., from navigation satellites, or land-based stations, from which position estimates can be computed. The size and location of navigation signal antenna 52 is illustrative only, and may in practice be pivotably or retractably mounted, may be detachable, or may be designed into the housing of mobile terminal 20.

Figure 3:
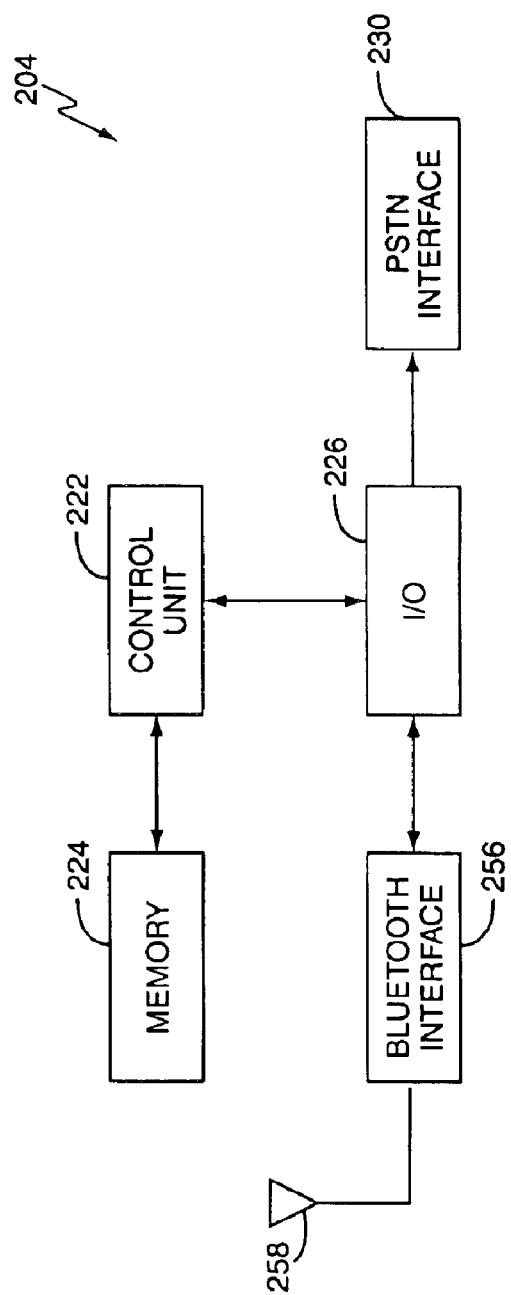
FIG. 3 is a block diagram illustrating the functional elements of an exemplary base unit.

FIG. 3 is a block diagram of a base unit 204. The term base unit as used herein refers to a fixed station with a short-range radio interface, such as a Bluetooth interface, that communicates with the mobile terminal 20. The base unit 204 may comprise part of a conventional cordless telephone system (CTS), a computing device, or other appliance with a short-range radio interface. The computing device or appliance may be connected to a local area network (LAN) or equipped with a modem to interface the appliance with the PSTN 300. In the exemplary embodiment described herein, the base unit 204 comprises the fixed station in a CTS 200 and serves as a terminal end point from the point-of-view of the PSTN 300.

Base unit 204 handles call set-up requests to/from PSTN 300. The base unit 204 comprises a main control unit 222 for controlling the operation of base unit 204 and memory 224 for storing control programs and data used by the base unit 204 during operation. Input/output circuits 226 interface the control unit 222 with a conventional PSTN interface 230 and also with Bluetooth interface 256, which may use antenna 258. PSTN interface 230 is electrically and operatively coupled to PSTN 300.

The mobile terminal 20 of the present invention is capable of communicating with both the PSTN 300 via a base station 110 or via base unit 204 or CTS 200. For communications with the PLMN 100, the mobile terminal 20 uses its long-range receiver 38 and transmitter 40. Communications with the PLMN 100 may be governed by a variety of different multiple access standards, such as TDMA and CDMA, and a variety of communication protocols, such as TIA/EIA-136, GSM, IS-95, and cdma 2000. The details of the communication protocol used by the mobile terminal 20 are not material to the invention. For a description of a typical TDMA system, the interested reader is referred to "The GSM System for Mobile Communications" by Michelle Boule and Marie-Bernadette Pautet, which provides a comprehensive overview of GSM systems. Also, for a description of CDMA systems, the reader is referred to "IS-95 CDMA and cdma 2000" by Vijay K. Garg, which provides an overview of CDMA systems. Both of these references are incorporated herein by reference.

In a cordless phone mode, mobile terminal 20 communicates with base unit 204 in the CTS 200 using Bluetooth interface 56 or other short-range interface. When the mobile terminal 20 moves within range of the base unit 204, the mobile terminal 20 mates with or establishes communication with the base unit 204. Conversely, when the mobile terminal 20 moves out of range of the base unit 204, the mobile terminal 20 exits the mated state of operation.

Once mobile terminal 20 mates with (i.e., establishes a connection) the base unit 204, the mobile terminal 20 may receive or initiate calls via CTS 200. Upon entering a mated state with the base unit 204, the mobile terminal 200 may simultaneously maintain service with the PLMN 100, or may terminate service with the PLMN 100. In the latter case, measures should be taken to ensure that active calls are not disrupted. Therefore, upon mating with the CTS 200, the mobile terminal 20 may terminate service with the PLMN 100 after active calls are terminated. In cases where the mobile terminal 20 maintains service simultaneously on both the PLMN 100 and CTS 200, priorities can be established governing which interface to use for initiating a communication session. For example, the mobile terminal 20 may prefer the CTS 200 when placing voice calls and may prefer the PLMN 100 when placing data calls. The priorities established may be as complex or simple as desired and may be determined either by the manufacturer of the mobile terminal 20 or by the user. In the latter case, the user may select priorities using keypad 28 from a menu of choices presented to the user on display 30.

Figure 4:
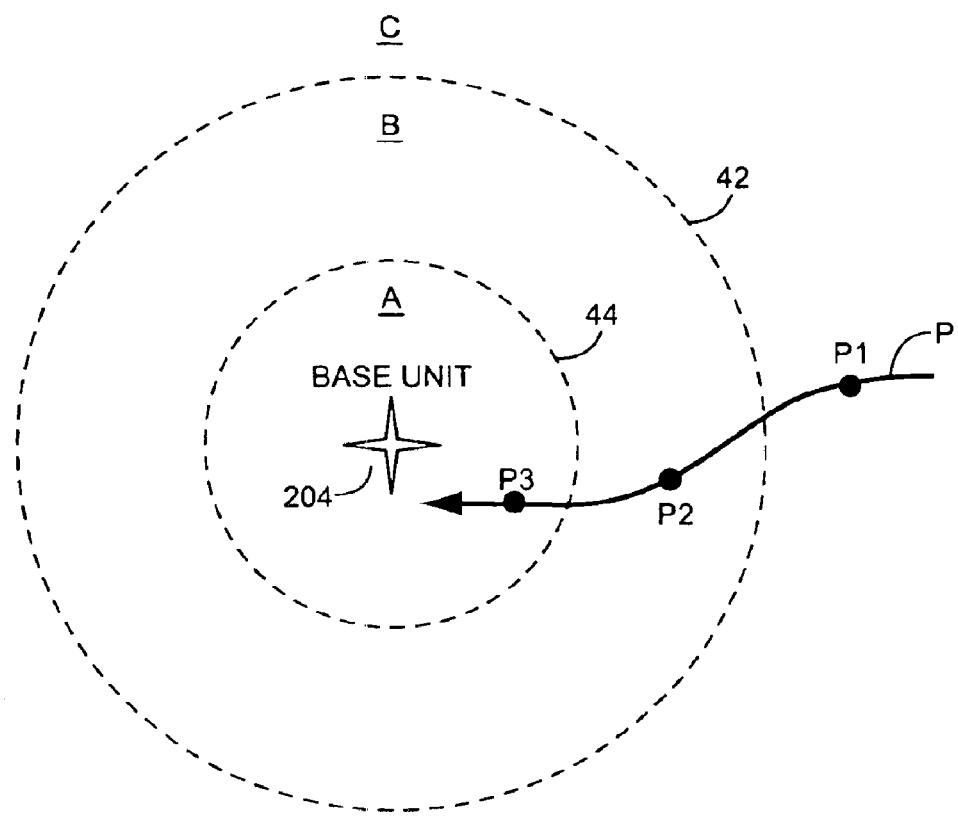
FIG. 4 is a conceptual diagram illustrating how a mobile terminal might vary the frequency with which it searches for a base unit based on distance from the base unit.

When the mobile terminal 20 is out of range of the base unit 204, the mobile terminal 20 may periodically conduct a search for the base unit 204. The term search as used herein means either transmitting messages to the base unit 204 and waiting for a reply, or listening for transmissions from the base unit 204. According to the present invention, position information is used as an aid to control searching by the mobile terminal 20 for the base unit 204 in order to conserve battery power, as shown schematically in FIG. 4. In FIG. 4, base unit 204 is shown at the center of two concentric circles that define three Probability Zones A, B, and C. Probability Zone A comprises the area inside the inner circle, Probability Zone B comprises the area inside the outer circle not included within the inner circle, and Probability Zone C comprises the area outside the outer circle. Probability Zone A represents the area closest to base unit 204 inside of which the mobile terminal 20 is most likely able to establish communication with the base unit 204. Probability Zone B represents an area where communication with the base unit 204 may be established but with lower probability. In this example, Probability Zone C represents an area where communication with the base unit 204 is not likely to be established.

Line P represents a possible path traveled by the mobile terminal 20. At point P1, the mobile terminal 20 is within Probability Zone C and, presumably, out of the range of the base unit 204. Therefore, to conserve power, mobile terminal 20 disables searching for the base unit 204 when it is in Probability Zone C. At point P2, the mobile terminal 20 is within Probability Zone B and, therefore, may be able to establish communication with the base unit 204. Therefore, the mobile terminal 20 begins searching for the base unit 204 when it crosses the outer boundary 42 of Probability Zone B, which represents a threshold for searching. That is, when the mobile terminal 20 crosses boundary 42 moving toward the base unit 204, the mobile terminal 20 initiates searching for the base unit 204 with a search frequency denoted as F1. Conversely, when the mobile terminal 20 crosses boundary 42 moving away from the base unit 204, the mobile terminal 20 disables searching to conserve battery power.

At point P3, mobile terminal 20 is within Probability Zone A. In this zone, mobile terminal 20 is likely to be able to establish communication with the base unit 204. When mobile terminal 20 crosses the outer boundary 44 of Probability Zone A moving toward base unit 204, the mobile terminal 20 automatically increases the frequency of searching to a search frequency denoted as F2. Thus, the mobile terminal 20 switches from search frequency F1 to search frequency F2 when crossing boundary 44 moving toward the base unit 204. Conversely, the mobile terminal 20 switches from search frequency F2 to search frequency F1 when crossing boundary 44 moving away from base unit 204. Frequencies F1 and F2 may be programmed or, alternatively, selected by the user.

In summary, mobile terminal 20 enables and disables searching for the base unit 204 depending upon its distance from the base unit 204. When searching is enabled, the mobile terminal 20 varies the frequency of searching as a function of its distance from base unit 204.

The manner of searching is governed by the communication protocols of the Bluetooth standard or other standard used by the mobile terminal 20. Since the Bluetooth standard is well known to those in the field, only a brief summary of the search procedures is provided herein.

Under the Bluetooth standard, a mobile terminal 20 that is out of range of its base unit 204 may search for base unit 204 by periodically transmitting messages to base unit 204 and waiting for a reply. The Bluetooth standard employs several types of messages that may be transmitted by the mobile terminal 20 to conduct a search. If the mobile terminal 20 already knows the identity of the base unit 204, the mobile terminal 20 can simply transmit a Page message that includes a code derived from the base unit's identity. On the other hand, if the mobile terminal 20 does not know the base unit's identity, the mobile terminal 20 may send an Inquiry message to which the base unit 204 may reply. In this case, the reply would include the base unit's identity. The mobile terminal 20 could then transmit a Page message to the base unit 204 to establish a connection. Base unit 204 periodically wakes and listens for mobile terminals 20 that may be searching for it. In each listening interval, base unit 204 monitors a different frequency in its wake-up hop-sequence. The order in which base unit 204 cycles through the set of frequencies is pseudo-random in nature and may not be known by mobile terminal 20. When the base unit 204 receives a message (e.g., Page or Inquiry message) transmitted by the mobile terminal 20, it replies by transmitting an acknowledgement to the mobile terminal 20. The base unit 204 then transmits operating parameters, such as the base unit identity and clock, which is used to establish a connection. The mobile terminal 20 then enters a mated state of operation wherein a low-power RF communications link with the base unit 204 is established and maintained via the Bluetooth interface.

Alternatively, the mobile terminal 20 can perform a search for the base unit 204 by listening for transmissions from the base unit 204. Upon receiving transmissions from the base unit 204, the mobile terminal 20 would, in this case, transmit a reply to the base unit 204. The base unit 204 would then transmit operating parameters to the mobile terminal 20 to use to establish a connection. Thereafter, the mobile terminal 20 and base unit 204 would enter into a mated state.

In the first case, where the mobile terminal 20 searches for the base unit 204 by transmitting a code, the search frequency is controlled according to the present invention based on the distance of the mobile terminal 20 from the base unit 204. The distance of the mobile terminal 20 from the base unit 204 may also be used to control the duration of the search, i.e., how long the search lasts once it is initiated. In the second case, where the mobile terminal 20 searches by periodically waking and listening for a code transmitted by the base unit 204, the position of the mobile terminal 20 may also be used to control the wake-up period. The wake-up period may have both a frequency parameter and a duration parameter. The frequency parameter controls how often the mobile terminal 20 wakes. For purposes of further discussion, it is assumed that the wake-up period has a frequency of N. The duration is the length of time that the mobile terminal 20 remains awake measured from the time that the mobile terminal 20 wakes. The duration is denoted herein as M. The position of the mobile terminal 20 may be used to control the wake-up frequency N and/or duration M. For example, the mobile terminal 20 could wake up less frequently when it is far away from the base unit 204, and more frequently when it is closer to the base unit 204. Similarly, the duration D of the wake-up period may be longer when the mobile terminal 20 is closer to the base unit 204 and shorter when the mobile terminal 20 is farther from the base unit 204. Also, there may be some predetermined threshold beyond which the mobile terminal 20 does not wake up and listen for the base unit 204.

Figure 5:
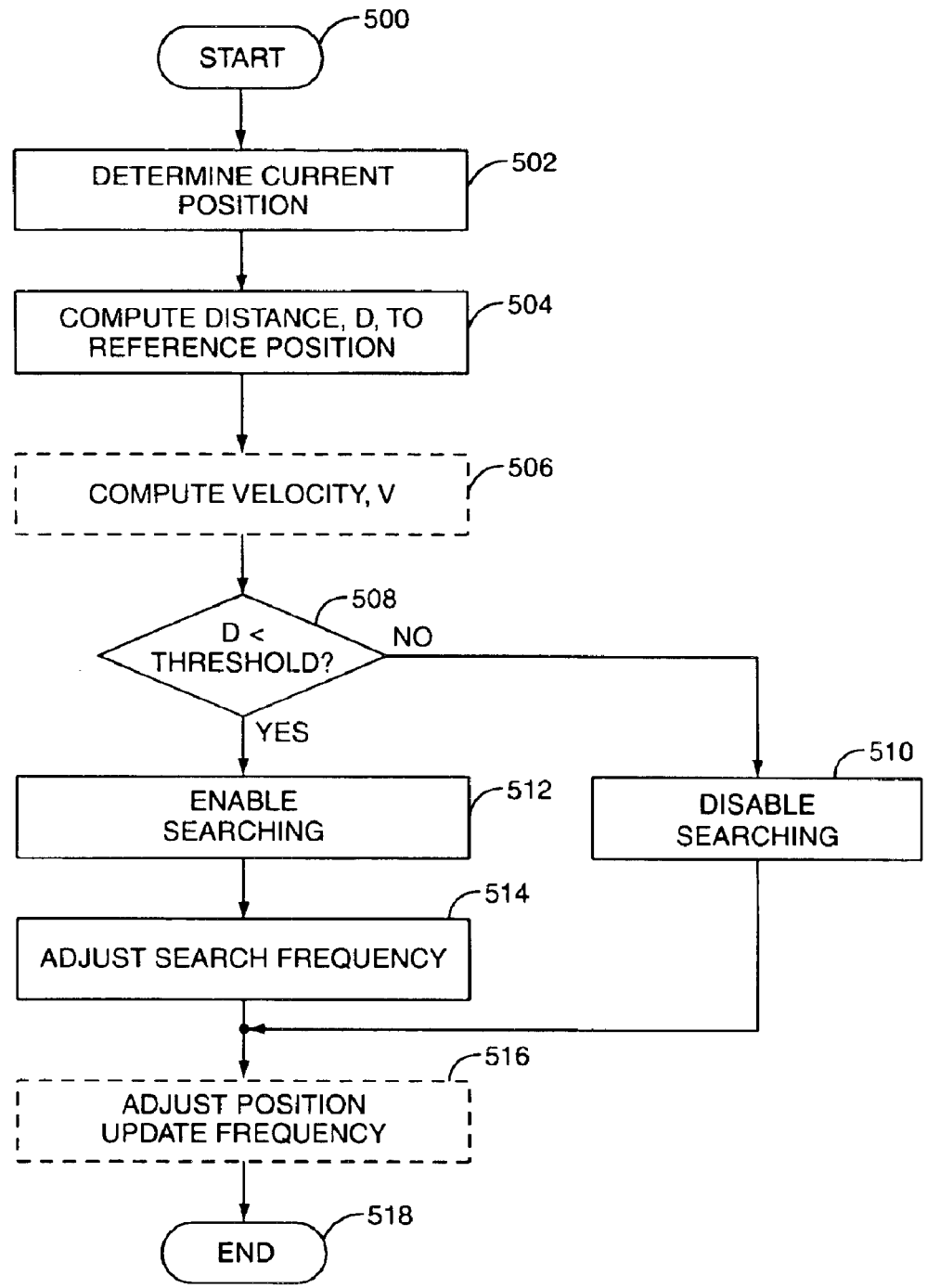
FIG. 5 is a flow chart illustrating an exemplary procedure to control searching by a mobile terminal for a cordless base unit.

FIG. 5 is a flow diagram illustrating an exemplary procedure to control searching by mobile terminal 20 for the base unit 204. At block 500, a triggering event causes the control unit 22 to initiate the position update routine. The triggering event may, for example, be the expiration of a timer used by control unit 22 that determines the position update frequency of the mobile terminal 20. This timer (not shown) may be initially set to a predetermined default value and updated as hereinafter described. Upon expiration of the timer, or upon the occurrence of some other triggering event, mobile terminal 20 determines its current position (block 502) and thereafter computes the distance D of the current position to a reference position associated with the base unit 204 (block 504). The reference position is stored in memory 24, which may comprise a smart card. The reference position may be input by the user or learned by the mobile terminal 20. The mobile terminal 20 may optionally compute the speed or velocity of the mobile terminal 20 at block 506 based on two or more position estimates over a period of time. At block 508, the distance D is compared to a predetermined threshold which, in the disclosed embodiment, is the outer boundary 42 of Probability Zone B. The predetermined threshold may assume some default value, or it may be established based on user input, or it may be "learned." The boundary 42 is stored in memory 24 which, as previously described, may comprise a smart card. If distance D is less than the predetermined threshold, control unit 22 enables searching for base unit 204 by Bluetooth interface 56 (block 512). In block 514, control unit 22 sets or adjusts the search behavior of the Bluetooth interface 56, for example, by altering the frequency or duration of the search. Alternatively, control unit 22 may control the frequency or duration of a wake-up period. Control unit 22 may base the selected search frequency on distance D, velocity V, or a combination of D and V. If distance D is not less than the predetermined threshold, control unit 22 may optionally disable searching by Bluetooth interface 56 (block 510). Bluetooth interface 56 may be used for other purposes so it may not always be desirable to completely disable the Bluetooth interface 56. Alternatively, the search frequency of the Bluetooth interface 56 could be set to a minimum value in block 510.

In block 516, the mobile terminal 20 may adjust the position update frequency as needed based on the computed distance D, velocity V, or a combination of the distance D and velocity V. U.S. patent application Ser. No. 09/656,894 entitled "Method to Control the Update Frequency of a Positioning Device by a Mobile Terminal" discloses a method for adjusting the position update frequency and is incorporated herein by reference. In block 518, the procedure for controlling searches by Bluetooth interface 56 for base unit 204 terminates.

The algorithm for adjusting the search frequency or other search behavior at block 514 may be as simple or as complex as needed or desired in a particular application. FIG. 4 represents one possible method of adjusting the search frequency. As shown in FIG. 4, adjustments to the search frequency are made incrementally in steps when the mobile terminal 20 crosses a defined threshold, which in FIG. 4 is represented by boundary 42 between Probability Zones A and B. Any number of probability zones and thresholds may be used. Alternatively, the algorithm to adjust the search frequency may be simply a mathematical function of the distance and/or velocity of the mobile terminal 20. Numerous mathematical formulas could be used that increase the frequency of searching as the mobile terminal 20 gets closer to the base unit 204 and decrease the search frequency as the mobile terminal 20 moves away from the base unit 204. Using such a formula, the search frequency could be varied continuously, rather than in steps as shown in FIG. 4.

Similarly, the algorithm for adjusting the position update frequency of the mobile terminal 20 at block 516 may be as simple or as complex as needed or desired in a particular application. In one embodiment of the invention, the position update procedure employs a sliding scale so that position updating becomes more frequent as the mobile terminal 20 moves closer to a point of interest and becomes less frequent as the mobile terminal 20 moves farther from a point of interest. A sliding scale can be implemented, for example, by comparing the computed distance D of the mobile terminal 20 from the reference position of the base unit 204 to one or more predetermined set points and adjusting the update frequency accordingly. By reducing the update frequency as the mobile terminal 20 moves away from the point of interest, the power drain on the battery can be significantly reduced.

The reference position used at block 504 to compute distance D may be programmed by the user, either by inputting a reference location via keypad 28 or by causing mobile terminal 20 to store its current position in response to a user command. Alternatively, control unit 22 could determine its current position when the mobile terminal 20 is operating in mated mode (i.e.; mobile terminal 20 has established short-range radio communications with base unit 204) and could store its current position as the reference position. Such action could take place without user input. For example, the mobile terminal 20 could note its current location when it mates with base unit 204. If the current location at that time differs from a previously-stored reference location for that particular base unit 204, the mobile terminal 20 could update the reference location using the current location as the new reference location.

There may be circumstances under which the mobile terminal 20 is unable to generate a position estimate when it is mated with the base unit 204. For example, the base unit 204 may be located in a high rise apartment or in another environment where the mobile terminal 20 is unable to acquire a GPS signal. In such circumstances, the mobile terminal 20 may not be able to generate an exact reference location for the base unit 204. In such circumstances, the mobile terminal 20 may be programmed to learn or define a home area surrounding the base unit 204, which home area can then be used as a reference location. More particularly, when the mobile terminal 20 has mated with the base unit 204 and is unable to acquire a GPS signal, the mobile terminal 20 can enter a learning mode. In learning mode, the mobile terminal 20 may store a plurality of reference positions that generally correspond to a perimeter or boundary of the home area. That is, the plurality of reference positions define a boundary surrounding the base unit 204. The reference positions may be obtained by recalling the last known position as the mobile terminal 20 enters the home area, or by determining the position of the mobile terminal 20 as it exits the home area. The perimeter may be updated during several entry and exit events. The perimeter defined in this manner may be used in place of a known reference location to compute a rough estimate of the distance D to the base unit 204. That is, the mobile terminal 20 may compute the distance between its current position and the perimeter surrounding the home area and use this distance in deciding whether to update the search behavior of the mobile terminal 20. Alternatively, the mobile terminal 20 may use a position inside the perimeter as the reference location of the base unit 204.

The perimeter of a home area or other threshold may also be defined through interaction of the mobile terminal 20 with the user when a GPS signal is available. In this case, the user may cause the mobile terminal 20 to determine and store a reference position on the perimeter when entering or exiting the home area by issuing commands to the mobile terminal 20. Thus, the user may cause the mobile terminal 20 to define a perimeter that may subsequently be used as a trigger for altering the search behavior of the mobile terminal 20 (e.g., changing the search frequency).

Figure 6:
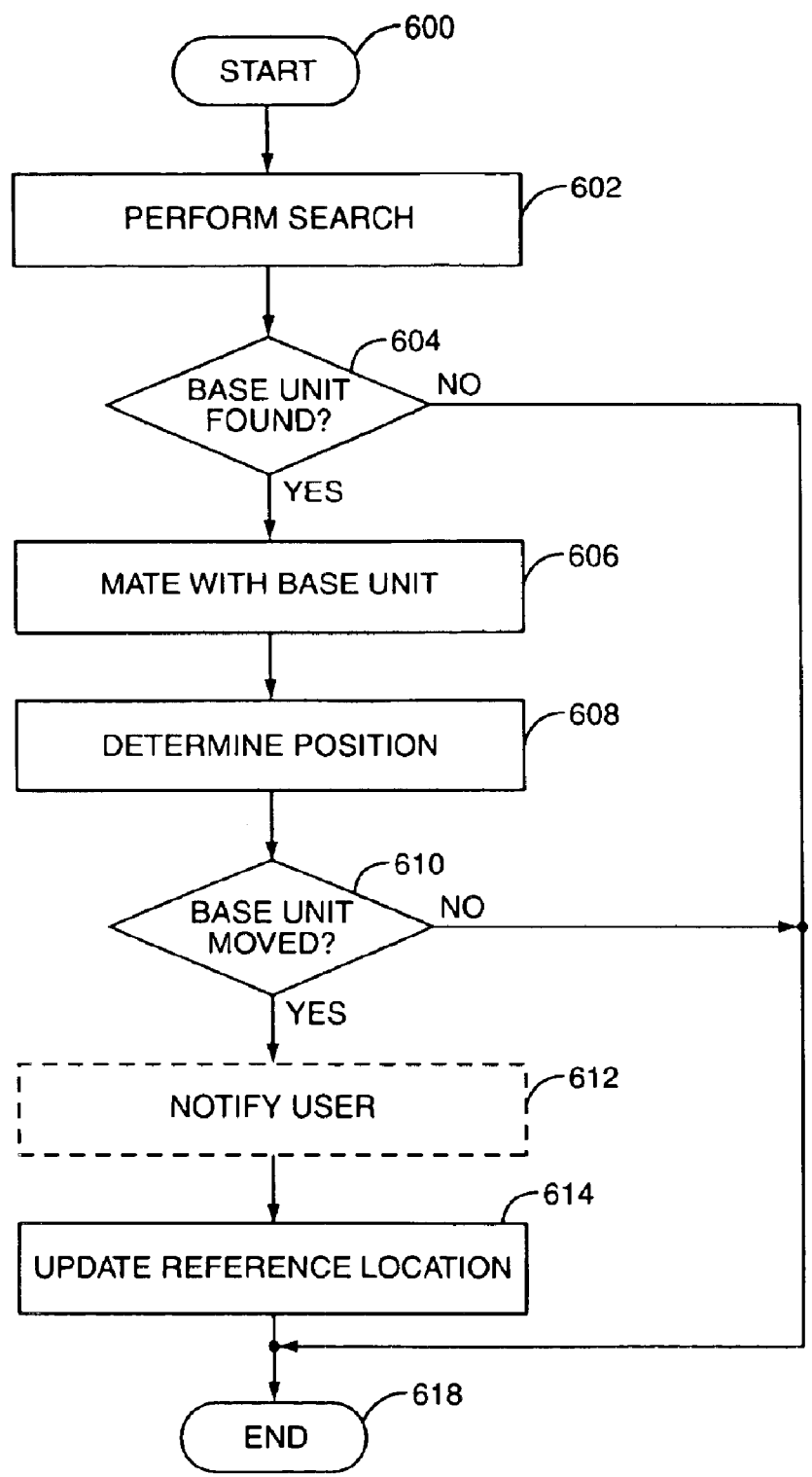
FIG. 6 is a flow chart illustrating an exemplary procedure for performing a search by a mobile terminal for a base unit.

FIG. 6 is a flow diagram illustrating an exemplary search procedure used by mobile terminal 20. At block 600, a triggering event causes Bluetooth interface 56 to search for base unit 204. The triggering event may, for example, be the expiration of a timer used by Bluetooth interface 56 that determines the search frequency. This timer (not shown) may initially be set to a predetermined default value and updated, as shown in FIG. 5 Upon expiration of the timer, or upon the occurrence of some other triggering event, Bluetooth interface 56 initiates a search for base unit 204 (block 602). If base unit 204 is within range, it will acknowledge receipt of the identity of mobile terminal 20 as previously described. Bluetooth interface 56 will receive this return acknowledgement and will recognize that base unit 204 has been found (block 604). In a manner prescribed by Bluetooth specifications, Bluetooth interface 56 will then establish communication or mate with base unit 204 (block 606). At block 608, control unit 22 recognizes that Bluetooth interface 56 has entered a mated-mode of operation and causes radiolocation receiver 50 to determine the position of mobile terminal 20. If the mobile terminal 20 is not able to determine its position, the user may be notified. Control unit 22 may optionally compare the current position of mobile terminal 20 with a previously-stored reference location associated with the base unit 204 (block 610). If the comparison of block 610 indicates that the location of the base unit 204 has changed, then at block 612, mobile terminal 20 may notify the user that it has found base unit 204 at a new location. Mobile terminal 20 may then update the reference location (block 614). Update of the reference location may be performed automatically, or it may be performed in response to input from the user.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented in a mobile terminal for establishing communications with a base unit in a cordless phone system, said method comprising:

storing a geographic location associated with said base unit in said mobile terminal;

determining a current location of said mobile terminal;

computing a distance between said current location of said mobile terminal and said stored geographic location associated with said base unit;

conducting a search for said base unit to establish communication with said base unit; and controlling searching for said base unit based on said computed distance between said current location of said mobile terminal and said stored geographic location associated with said base unit by varying a search behavior of said mobile terminal dependent upon said computed distance between said current location of said mobile terminal and said stored geographic location associated with said base unit.

2. The method of claim 1 wherein varying a search behavior of said mobile terminal dependent upon said distance between said current location of said mobile terminal and said stored geographic location associated with said base unit comprises varying the frequency of said search.

3. The method of claim 1 wherein varying a search behavior of said mobile terminal dependent upon said distance between said current location of said mobile terminal and said stored geographic location associated with said base unit comprises varying the duration of said search.

4. The method of claim 1 wherein storing a geographic location associated with said base unit comprises:

determining the current location of said mobile terminal when communication with said base unit is established; and storing said current location of said mobile terminal when communication with said base unit is established as said geographic location.

5. The method of claim 1 wherein storing a geographic location associated with said base unit comprises:

determining the current location of said mobile terminal; and storing said current location of said mobile terminal in response to user input as said geographic location.

6. The method of claim 1 wherein storing a geographic location associated with said base unit comprises inputting said geographic location by a user.

7. The method of claim 1 wherein storing a geographic location associated with said base unit comprises storing said geographic location in a removable smart card.

8. The method of claim 1 further comprising updating said geographic location stored in said mobile terminal following a change in said geographic location.

9. The method of claim 8 wherein updating said reference geographic location stored in said mobile terminal following a change in said geographic location comprises:
   determining the current location of said mobile terminal when communication with said base unit is established;
   comparing said current location of said mobile terminal to said stored geographic location to detect a change in said geographic location; and
   if a change in said geographic location is detected, storing said current location in said mobile terminal as an updated geographic location.

10. The method of claim 9 further comprises notifying a user when a change in said geographic location is detected by said mobile terminal.

11. The method of claim 10 wherein updating said geographic location stored in said mobile terminal following a change in said geographic location further comprises prompting the user to accept a change in said geographic location stored in said mobile terminal.

12. The method of claim 8 wherein updating said geographic location stored in said mobile terminal following a change in said geographic location comprises:
   determining the current location of said mobile terminal in response to user input; and
   storing said current location of said mobile terminal determined in response to said user input as an updated geographic location.

13. The method of claim 1 wherein controlling searching for said base unit based on said distance between said current location of said mobile terminal and said stored geographic location associated with said base unit comprises determining a threshold for varying said search behavior.

14. The method of claim 13 wherein determining said threshold comprises defining a boundary of a home area containing said geographic location, wherein said boundary serves as said predetermined threshold.

15. The method of claim 14 wherein defining a boundary of a home area containing said geographic location comprises setting said boundary in response to user input.

16. The method of claim 15 wherein defining a boundary of a home area containing said geographic location comprises:
   determining the current location of said mobile terminal at a plurality of time instants when communication with said base unit is established; and
   determining said boundary of said home area based on said current location of said mobile terminal at said plurality of time instants.

17. The method of claim 1 further comprising determining a position update frequency based on said distance between said current location of said mobile terminal and said geographic location.

18. The method of claim 17 wherein determining said position update frequency based on said distance between said current location of said mobile terminal and said geographic location comprises increasing said update frequency as said distance between said current location of said mobile terminal and said geographic location decreases.

19. The method of claim 17 wherein determining a position update frequency based on said distance between said current location of said mobile terminal and said geographic location comprises decreasing said update frequency as said distance between said current location of said mobile terminal and said geographic location increases.

20. The method of claim 17 further comprising determining the velocity of said mobile terminal based on two or more position estimates.

21. The method of claim 20 wherein determining said position update frequency based on said distance between said current location of said mobile terminal and said geographic location further comprises determining said position update frequency as a function of said distance between said current location and said geographic location and said velocity of said mobile terminal.

22. The method of claim 21 wherein determining said position update frequency as a function of said distance between said current location of said mobile terminal and said geographic location and said velocity of said mobile terminal comprises increasing said position update frequency as said velocity increases and decreasing said position update frequency as said velocity decreases.

23. The method of claim 1 further comprising updating said current position of said mobile terminal when communication with said base unit is established.

24. The method of claim 23 wherein updating said current position of said mobile terminal when communication with said base unit is established comprises notifying a user if said current position cannot be determined.

25. A dual function mobile terminal compatible with a cordless phone system comprising:
   a positioning receiver to compute a current location of said mobile terminal;
   a short-range RF interface to communicate with a base unit in said cordless phone system when said mobile terminal is within the range of said base unit and to search for said base unit when said mobile terminal is out of range of said base unit;
   a processor to compute the distance between said current location of said mobile terminal and a stored geographic location for said base unit and to control a search behavior of said short-range interface based on said computed distance.

26. The mobile terminal of claim 25 wherein said short-range RF interface periodically searches for said base unit with a predetermined search frequency.

27. The mobile terminal of claim 26 wherein said processor controls said search behavior of said RF interface by varying said search frequency based on said distance between said current location of said mobile terminal and said geographic location for said base unit.

28. The mobile terminal of claim 25 wherein said processor is programmed to store said current location as said geographic location when said RF interface has established communication with said base unit.

29. The mobile terminal of claim 25 wherein said mobile terminal further comprises a user interface and wherein said processor is programmed to store said current location as said geographic location in response to user input via said user interface.

30. The mobile terminal of claim 25 wherein said mobile terminal further comprises a user interface and wherein said processor is programmed to store as said geographic location a location input by a user via said user interface.

31. The mobile terminal of claim 25 wherein said processor is programmed to update said geographic location when said processor detects a change in the location of said base unit.

32. The mobile terminal of claim 31 wherein said processor detects a change in the location of said base unit by determining said current location of said mobile terminal upon mating with said base unit and comparing said current location upon mating with said base unit to a previously-stored geographic location for said base unit.

33. The mobile terminal of claim 32 wherein said mobile terminal further comprises a user interface and wherein processor notifies the user via said user interface when said processor detects a change in said geographic location.

34. The mobile terminal of claim 33 wherein said processor prompts the user via said user interface to accept a change in said geographic location when said processor detects a change in said geographic location.

35. The mobile terminal of claim 34 wherein said processor updates said current location of said mobile terminal as an updated geographic location in response to user input via said user interface.

36. The mobile terminal of claim 25 wherein the processor is programmed to define a boundary of a home area containing said geographic location, said processor using said boundary to control a search behavior of said RF interface.

37. The mobile terminal of claim 36 wherein said mobile terminal further comprises a user interface and wherein said processor is programmed to define said boundary in response to input from the user via said user interface.

38. The mobile terminal of claim 36 wherein said processor is programmed to define said boundary containing said geographic location by determining said current location of said mobile terminal when said RF interface establishes communication with said base unit.

39. The mobile terminal of claim 25 wherein said processor determines a position update frequency based on said distance between said current location of said mobile terminal and said geographic location.

40. The mobile terminal of claim 39 wherein said processor is further programmed to increase said update frequency as said distance decreases between said current location of said mobile terminal and said geographic location.

41. The mobile terminal of claim 39 wherein said processor is further programmed to decrease said update frequency as said distance increases between said current location of said mobile terminal and said geographic location.

42. The mobile terminal of claim 39 wherein said processor is programmed to determine the velocity of said mobile terminal by computing the difference in two or more of said position estimates.

43. The mobile terminal of claim 42 wherein said processor is further programmed to determine said position update frequency as a function of said distance between said current location of said mobile terminal and said geographic location, and as a function of said velocity of said mobile terminal.

44. The mobile terminal of claim 43 wherein said processor is programmed to determine said position update frequency as a function of said distance between said current location of said mobile terminal and said geographic location and as a function of said velocity of said mobile terminal; said processor is further programmed to increase said position update frequency as said velocity increases; said processor is further programmed to decrease said position update frequency as said velocity decreases.

45. A system to permit communication of a wireless mobile terminal with the public switched telephone network comprising:

a public land mobile network;

a private cordless base unit connected to the public switched telephone network in the same manner as a conventional corded telephone;

a mobile terminal comprising:
a positioning receiver to compute a current location of said mobile terminal;
a short-range RF interface to communicate with a said private cordless base unit when said mobile terminal is within the range of said private cordless base unit and to search for said private cordless base unit when said mobile terminal is out of range of said base unit;
a processor to compute the distance between said current location of said mobile terminal and a stored geographic location for said private cordless base unit and to control a search behavior of said short-range interface based on said computed distance.

* * * * *